United States Patent
Chapman et al.

[11] Patent Number: 5,401,618
[45] Date of Patent: Mar. 28, 1995

[54] INFRARED-ABSORBING CYANINE DYES FOR LASER ABLATIVE IMAGING

[75] Inventors: Derek D. Chapman, Rochester; Linda Kaszczuk, Webster, both of N.Y.

[73] Assignee: Eastman Kodak Company, Rochester, N.Y.

[21] Appl. No.: 291,254

[22] Filed: Aug. 16, 1994

Related U.S. Application Data

[63] Continuation-in-part of Ser. No. 99,969, Jul. 30, 1993, abandoned.

[51] Int. Cl.$^6$ ................................................ G03C 5/16
[52] U.S. Cl. ...................................... 430/330; 430/201; 430/269; 430/270; 430/944; 430/945; 430/964; 503/227; 347/232
[58] Field of Search .............. 430/201, 269, 270, 330, 430/944, 945, 964, 271; 503/227; 346/76 L

[56] References Cited

U.S. PATENT DOCUMENTS

| | | | |
|---|---|---|---|
| 4,948,778 | 8/1990 | DeBoer | 430/201 |
| 4,973,572 | 11/1990 | DeBoer | 503/227 |
| 4,994,343 | 2/1991 | Inagaki et al. | 430/270 |
| 4,996,089 | 2/1991 | Saito et al. | 430/945 |
| 5,034,303 | 7/1991 | Evans et al. | 430/200 |
| 5,156,938 | 10/1992 | Foley et al. | 430/200 |
| 5,171,650 | 12/1992 | Ellis et al. | 430/20 |
| 5,182,186 | 1/1993 | Inagaki et al. | 430/270 |
| 5,330,876 | 7/1994 | Kaszczuk et al. | 430/944 |

*Primary Examiner*—Richard L. Schilling
*Attorney, Agent, or Firm*—Harold E. Cole

[57] ABSTRACT

A process of forming a single color, dye ablation image having an improved D-min comprising imagewise-heating by means of a laser, in the absence of a separate receiving element, a dye-ablative recording element comprising a support having thereon a dye layer comprising an image dye dispersed in a polymeric binder, the dye layer having an infrared-absorbing material associated therewith to absorb at a given wavelength of the laser used to expose the element, the image dye being substantially transparent in the infrared region of the electromagnetic spectrum and absorbs in the region of from about 300 to about 700 nm and does not have any substantial absorption at the wavelength of the laser used to expose the element, the laser exposure taking place through the dye side of the element, and removing the ablated image dye material to obtain an image in the dye-ablative recording element, wherein the infrared-absorbing material is a cyanine dye having a perfluorinated organic counterion.

10 Claims, No Drawings

INFRARED-ABSORBING CYANINE DYES FOR LASER ABLATIVE IMAGING

CROSS-REFERENCE TO RELATED APPLICATIONS

This is a continuation-in-part of application Ser. No. 08/099 969, filed Jul. 30, 1993, now abandoned.

This invention relates to use of certain infrared-absorbing cyanine dyes in a laser dye ablative recording element.

In recent years, thermal transfer systems have been developed to obtain prints from pictures which have been generated electronically from a color video camera. According to one Way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726A, the disclosure of which is hereby incorporated by reference.

In one ablative mode of imaging by the action of a laser beam, an element with a dye layer composition comprising an image dye, an infrared-absorbing material, and a binder coated onto a substrate is imaged from the dye side. The energy provided by the laser drives off the image dye at the spot where the laser beam hits the element and leaves the binder behind. In ablative imaging, the laser radiation causes rapid local changes in the imaging layer thereby causing the material to be ejected from the layer. This is distinguishable from other material transfer techniques in that some sort of chemical change (e.g., bond-breaking), rather than a completely physical change (e.g., melting, evaporation or sublimation), causes an almost complete transfer of the image dye rather than a partial transfer. The transmission D-min density value serves as a measure of the completeness of image dye removal by the laser.

U.S. Pat. No. 4,973,572 relates to infrared-absorbing cyanine dyes used in laser-induced thermal dye transfer elements. In Example 3 of that patent, a positive image is obtained in the dye element by using an air stream to remove sublimed dye. Compound 1 of that patent discloses a cyanine dye having a counterion of $PF_6$. However, compounds having an organic perfluorinated counterion are not disclosed. Compounds having an inorganic perfluorinated counterion have a problem in that they give poor minimum densities upon ablative imaging.

U.S. Pat. No. 5,171,650 relates to an ablation-transfer image recording process. In that process, an element is employed which contains a dynamic release layer overcoated with an ablative carrier topcoat. An image is transferred to a receiver in contiguous registration therewith. The useful image obtained in this process is contained on the receiver element. There is no disclosure in that patent that a useful positive image can be obtained in the recording element or that the infrared-absorbing material should be a cyanine dye having an organic perfluorinated counterion.

U.S. Pat. No. 5,156,938 relates to the use of certain sensitizers, cyanine dyes and a decomposable binder, such as low viscosity nitrocellulose, in a laser-absorbing coating in conjunction with a separate receiving element. However, there is no disclosure in that patent of a single sheet process or that the infrared-absorbing material should be a cyanine dye having a perfluorinated organic counterion.

It is an object of this invention to provide a process for improving the D-min obtained in a dye-ablative recording element. It is another object of this invention to provide a single sheet process which does not require a separate receiving element.

These and other objects are achieved in accordance with the invention which comprises a process of forming a single color, dye ablation image having an improved D-min comprising imagewise-heating, by means of a laser, in the absence of a separate receiving element a dye-ablative recording element comprising a support having thereon a dye layer comprising an image dye dispersed in a polymeric binder, the dye layer having an infrared-absorbing material associated therewith to absorb at a given wavelength of the laser used to expose the element, the image dye being substantially transparent in the infrared region of the electromagnetic spectrum and absorbs in the region of from about 300 to about 700 nm and does not have any substantial absorption at the wavelength of the laser used to expose the element, the laser exposure taking place through the dye side of the element, and removing the ablated image dye material to obtain an image in the dye-ablative recording element, and wherein the infrared-absorbing material is a cyanine dye having a perfluorinated organic counterion.

Cyanine dyes useful in the invention can be any cyanine dyes provided they are IR-absorbing and have a perfluorinated organic counterion. In a preferred embodiment of the invention, the cyanine dyes of U.S. Pat. No. 4,973,572 are employed, the disclosure of which is hereby incorporated by reference, except that they have a perfluorinated organic counterion.

Perfluorinated organic counterions for the cyanine dyes useful in the invention include the following: pentafluoropropionate, heptafluorobutyrate, nonafluorobutanesulfonate, and similar perfluorinated organic anions. Following are cyanine dyes having perfluorinated organic counterions which are useful in the invention:

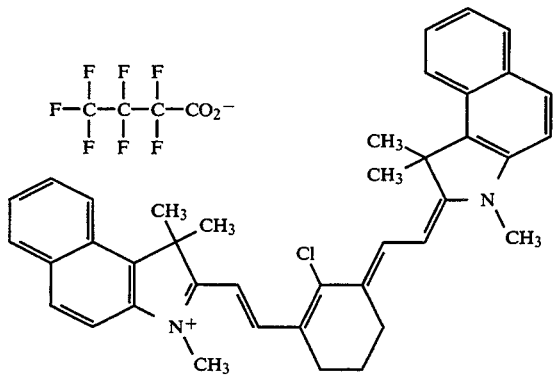

Compound 1

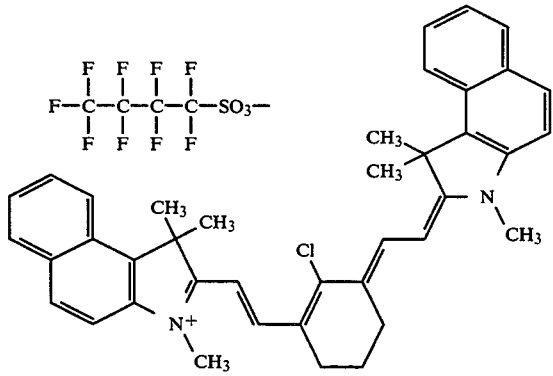

Compound 2

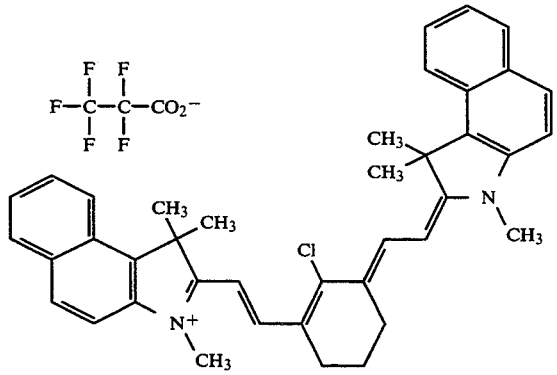

Compound 3

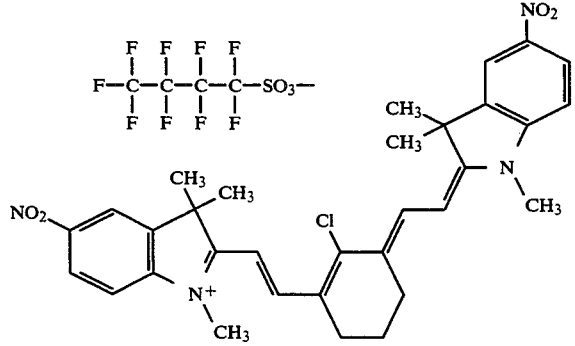

Compound 4

Compound 5

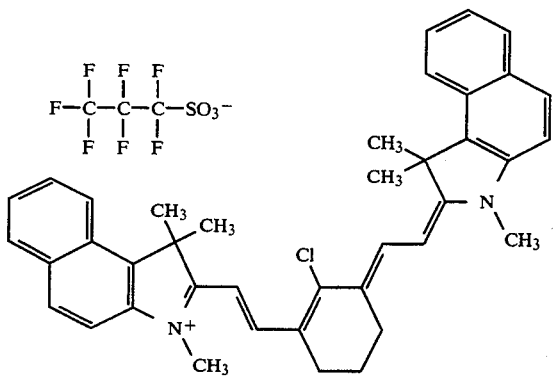

Compound 6

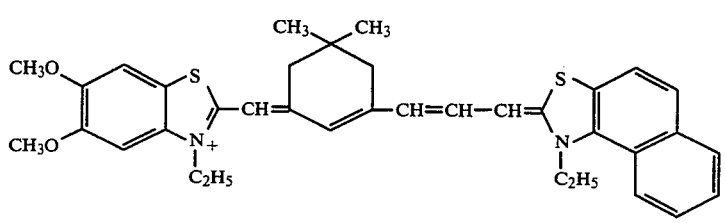

Compound 7

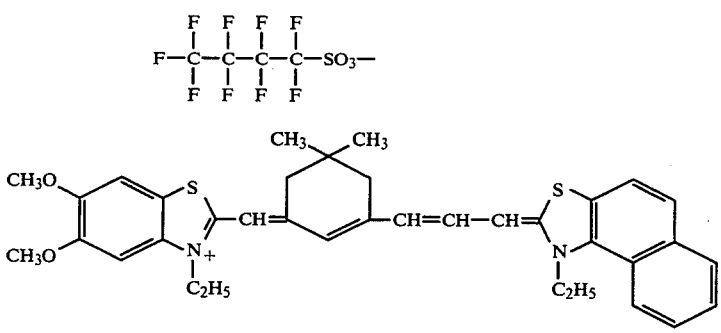

Compound 8

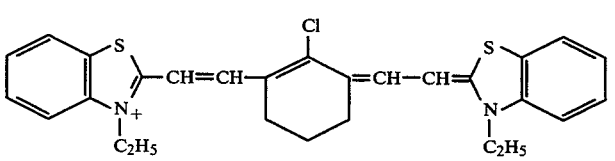

Compound 9

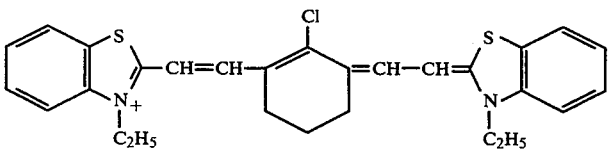

It has been found unexpectedly that the nature of the counterion of the cyanine dye in the dye layer of the above dye-ablative recording element for laser ablative imaging significantly affects the desired dye cleanout as evidenced by the resulting faster writing speeds to achieve a given minimum density. This is of importance for graphic arts applications where the D-min/D-max ratio of the mask controls the exposure latitude for subsequent use. This also improves the neutrality of the visual D-min for medical imaging applications. The dye removal process can be either in the continuous (photograph-like) or in the halftone mode. For purposes of this invention, monocolor refers to any single dye or dye mixture used to produce a single stimulus color. The resulting single-sheet medium can be used for creating medical images, reprographic masks, printing masks, etc., or it can be used in any application where a monocolored transmission negative is desired. The image obtained can be a positive or a negative image.

Any polymeric material may be used as the binder in the recording element employed in the process of the invention, including those disclosed in U.S. Pat. No. 5,330,876. For example, there may be used cellulosic derivatives, e.g., cellulose nitrate, cellulose acetate hydrogen phthalate, cellulose acetate, cellulose acetate propionate, cellulose acetate butyrate, cellulose triacetate, a hydroxypropyl cellulose ether, an ethyl cellulose ether, etc., polycarbonates; polyurethanes; polyesters; poly(vinyl acetate); polystyrene; poly(styrene-co-acrylonitrile); a polysulfone; a poly(phenylene oxide); a poly(ethylene oxide); a poly(vinyl alcohol-co-acetal) such as poly(vinyl acetal), poly(vinyl alcohol-co-butyral) or poly(vinyl benzal); or mixtures or copolymers thereof. The binder may be used at a coverage of from about 0.1 to about 5 g/m².

In a preferred embodiment, the polymeric binder used in the recording element employed in the process of the invention is decomposable. The term decomposable as used herein means a binder which will thermally decompose rapidly to give significant amounts of gases and volatile fragments at temperatures achieved during laser imaging, or one which will undergo significant reduction of decomposition temperature in the presence of small amounts of acids.

In another preferred embodiment, the cyanine dye employed in the recording element used in the invention is employed in the image dye layer.

In another embodiment of the invention, a hydrophilic barrier layer may be employed between the support and the dye layer as described and claimed in Ser. No. 099,970 of Topel and Kaszczuk, entitled, "Barrier Layer For Laser Ablative Imaging", filed Jul. 30, 1993.

To obtain a laser-induced, dye ablative image using the process of the invention, a diode laser is preferably employed since it offers substantial advantages in terms of its small size, low cost, stability, reliability, ruggedness, and ease of modulation. The laser ration is absorbed into the dye layer and converted to heat by a molecular process known as internal conversion. Thus, the construction of a useful dye layer will depend not only on the hue, transferability and intensity of the image dyes, but also on the ability of the dye layer to absorb the radiation and convert it to heat. The infrared-absorbing cyanine dye may be contained in the image dye layer itself or in a separate layer associated therewith, i.e., above or below the dye layer. As noted above, the laser exposure in the process of the invention takes place through the dye side of the dye ablative recording element, which enables this process to be a single sheet process, i.e., a separate receiving element is not required.

Lasers which can be used in the invention are available commercially. There can be employed, for example, Laser Model SDL-2420-H2 from Spectra Diode Labs, or Laser Model SLD 304 V/W from Sony Corp.

As described above, the image dye in the dye ablative recording element is substantially transparent in the infrared region of the electromagnetic spectrum and absorbs in the region of from about 300 to about 700 nm and does not have substantial absorption at the wavelength of the laser used to expose the element. Thus, the image dye is a different material from the infrared-absorbing material used in the element to absorb the infrared radiation and provides visible and/or UV contrast at wavelengths other than the laser recording wavelengths.

Any dye can be used in the dye-ablative recording element employed in the invention provided it can be ablated by the action of the laser and has the characteristics described above. Especially good results have been obtained with dyes such as anthraquinone dyes, e.g., Sumikaron Violet RS ® (product of Sumitomo Chemical Co., Ltd.), Dianix Fast Violet 3R-FS ® (product of Mitsubishi Chemical Industries, Ltd.), and Kayalon Polyol Brilliant Blue N-BGM ® and KST Black 146 ® (products of Nippon Kayaku Co., Ltd.); azo dyes such as Kayalon Polyol Brilliant Blue BM ®, Kayalon Polyol Dark Blue 2BM ®, and KST Black KR ® (products of Nippon Kayaku Co., Ltd.), Sumikaron Diazo Black 5G ® (product of Sumitomo Chemical Co., Ltd.), and Miktazol Black 5GH ® (product of Mitsui Toatsu Chemicals, Inc.); direct dyes such as Direct Dark Green B ® (product of Mitsubishi Chemical Industries, Ltd.) and Direct Brown M ® and Direct Fast Black D ® (products of Nippon Kayaku Co. Ltd.); acid dyes such as Kayanol Milling Cyanine 5R ® (product of Nippon Kayaku Col Ltd.); basic dyes such as Sumiacryl Blue 6G ® (product of Sumitomo Chemical Co., Ltd.), and Aizen Malachite Green ® (product of Hodogaya Chemical Co., Ltd.);

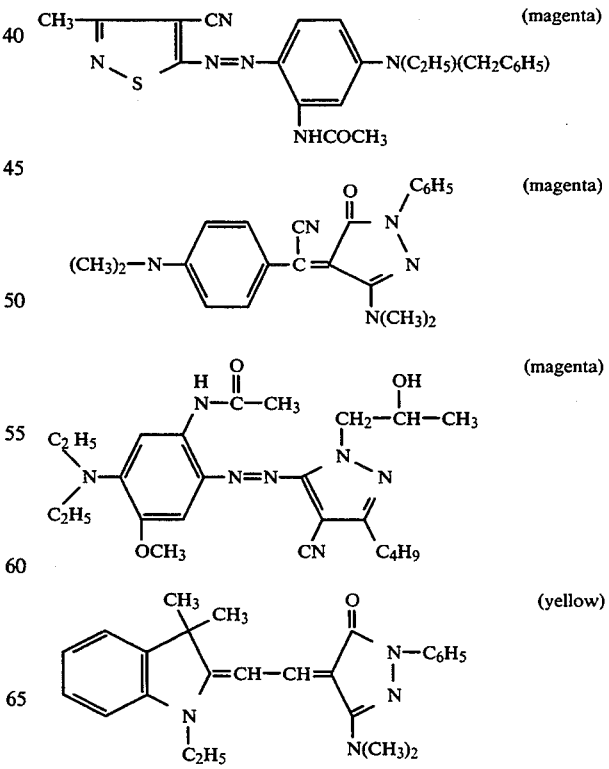

-continued

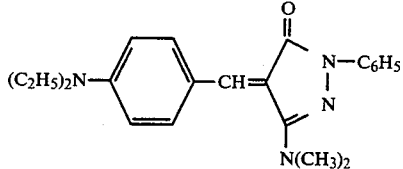 (yellow)

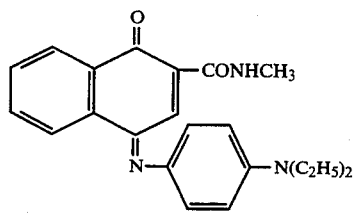 (cyan)

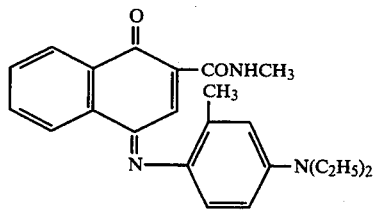 (cyan)

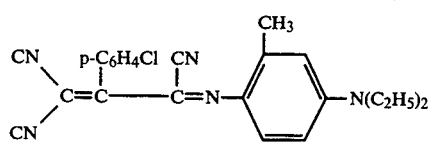 (cyan)

or any of the dyes disclosed in U.S. Pat. Nos. 4,541,830, 4,698,651, 4,695,287, 4,701,439, 4,757,046, 4,743,582, 4,769,360, and 4,753,922, the disclosures of which are hereby incorporated by reference: The above dyes may be employed singly or in combination. The dyes may be used at a coverage of from about 0.05 to about 1 g/m² and are preferably hydrophobic.

The dye layer of the dye-ablative recording element employed in the invention may be coated on the support or printed thereon by a printing technique such as a gravure process.

Any material can be used as the support for the dye-ablative recording element employed in the invention provided it is dimensionally stable and can withstand the heat of the laser. Such materials include polyesters such as poly(ethylene naphthalate; poly(ethylene terephthalate); polyamides; polycarbonates; cellulose esters such as cellulose acetate; fluorine polymers such as poly(vinylidene fluoride) or poly(tetrafluoroethylene-cohexafluoropropylene); polyethers such as polyoxymethylene; polyacetals; polyolefins such as polystyrene, polyethylene, polypropylene or methylpentene polymers; and polyimides such as polyimide-amides and polyether-imides. The support generally has a thickness of from about 5 to about 200 μm. It may also be coated with a subbing layer, if desired, such as those materials described in U.S. Pat. Nos. 4,695,288 or 4,737,486. In a preferred embodiment, the support is transparent.

The following examples are provided to illustrate the invention.

EXAMPLE 1

Preparation of the Infrared-Absorbing Dyes

The most convenient method of preparing the infrared-absorbing dyes of the invention consists of using the p-toluenesulfonate salts of the cyanine dyes disclosed in U.S. 4,973,572 and converting them to the desired perfluorinated anion salts by making use of the insolubility of potassium p-toluenesulfonate in acetonitrile.

For example, the heptafluorobutyrate salt was prepared by dissolving 60 g of the p-toluenesulfonate analog of the above dye in 600 mL acetonitrile and then adding a solution of potassium heptafluorobutyrate prepared by adding 10 g potassium bicarbonate to 20 g heptafluorobutyric acid in 20 mL acetonitrile. The solution was heated to gentle reflux while stirring for 30 min. and then allowed to cool. The precipitate of potassium p-toluenesulfonate was filtered off and dried. The yield was 15.6 g, corresponding to 91% of the theoretical yield. The filtrate was concentrated to one third of its volume and then diluted with ether. The product crystallized on scratching and was filtered off and washed with ether and waiter. The yield was 53 g of material which, when examined by NMR spectroscopy, did not show any bands attributable to the p-toluenesulfonate anion. Yield was 85%.

Analogous conversions were made to the pentafluoropropionate and the nonafluorobutane-sulfonate. The completeness of the conversions was checked by NMR analysis. The yields were in the 85–90% range.

EXAMPLE 2

Monocolor media sheets were prepared by coating the following layers on unsubbed 100 μm thick poly(ethylene terephthalate) support which had a barrier layer of 96% hydrolyzed poly(vinyl alcohol) obtained from Scientific Polymer Products, Inc. at 0.11 g/m² and 0.01 g/m² 10G surfactant (a reaction product of nonylphenol and glycidol) (Olin Corp.) coated from water.

Each of the above layers was overcoated with a cyan dye formulation containing 0.52 g/m² of RS 1139 sec cellulose nitrate (Aqualon Co.), 0.86 g/m² of the second cyan dye illustrated above from methyl isobutyl ketone, with the infrared-absorbing dyes in the amounts as shown in Table 1 below.

The media sheets were Secured to the drum of a diode laser imaging device as described in U.S. Pat. No. 4,876,235 with the recording layer facing outwards. The laser imaging device consisted of a single diode laser connected to a lens assembly mounted on a translation stage and focused onto the surface of the laser ablative recording element. The diode lasers employed were Spectra Diode Labs No. SDL-2430, having an integral, attached optical fiber for the output of the laser beam with a wavelength range 800–830 nm and a nominal power output of 250 milliwatts at the end of the optical fiber. The cleaved face of the optical fiber (50 μm core diameter) was imaged onto the plane of the dye-ablative element with a 0.5 magnification lens assembly mounted on a translation stage giving a nominal spot size of 25 μm.

The drum, 53 cm in circumference, was rotated at varying speeds and the imaging electronics were activated to provide the exposure as cited in Table 1. The translation stage was incrementally advanced across the dye-ablative element by means of a lead screw turned by a microstepping motor, to give a center-to-center line distance of 10 μm (945 lines per centimeter, or 2400 lines per inch). An air stream was blown over the donor surface to remove the sublimed dye. The measured average total power at the focal plane was 110 mW. The Status A red and blue densities of the dye layer before imaging were determined and were compared to the residual density after writing a D-min patch at 150 rev./min. The density values were obtained using an X-Rite densitometer Model 310 (X-Rite Co.). The following results were obtained:

TABLE 1

| IR Compound (g/m²) | Status A Red D-max | Status A Red D-min @ 830 mj/cm² exposure | Status A Blue D-max | Status A Blue D-min @ 830 mj/cm² exposure |
|---|---|---|---|---|
| Control 1 (0.18) | 3.92 | 0.14 | 0.30 | 0.05 |
| Compound 1 (0.25) | 4.14 | 0.09 | 0.41 | 0.00 |

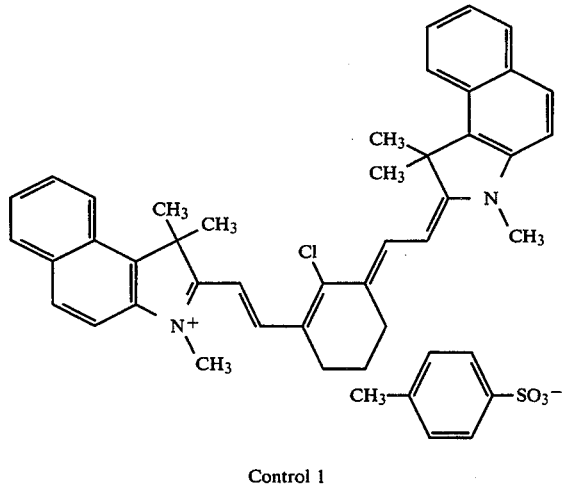

Control 1

The above densities were read after zeroing the densitometer against the base. The counterion change to a fluorinated species of the invention improved both the red and blue D-min's.

EXAMPLE 3

Neutral formulations with an aimed neutral density of 3.0 were coated on gelatin subbed support and read on a densitometer as in Example 2. The neutral formula was composed of 0.52 g/m² 1139 sec. cellulose nitrate with 0.30 g/m² of the second cyan dye illustrated above, 0.15 g/m² of the third cyan dye illustrated above, 0.16 g/m² of the second yellow dye illustrated above, 0.26 g/m² of the third magenta dye illustrated above plus the infrared-absorbing dye levels for constant adsorptivity as described in Table 2 below in methyl isobutyl ketone and coated on 178 μm poly(ethylene terephthalate) with a gelatin sub. The donors were tested as in Example 2 at both 150 and 200 rev/min at 830 mj/cm² and 623 mj/cm² with the following results:

TABLE 2

| IR Compound (g/m²) | Condition | Neutral | R | G | B |
|---|---|---|---|---|---|
| Control 1 (0.18) | D-max | 2.99 | 3.06 | 2.76 | 2.51 |
| Control (0.18) | D-min (830 mj/cm²) | 0.11 | 0.11 | 0.12 | 0.18 |
| Control (0.18) | D-min (623 mj/cm²) | 0.17 | 0.16 | 0.17 | 0.23 |
| Compound 1 (0.25) | D-max | 3.00 | 3.13 | 2.73 | 2.51 |
| Compound 1 (0.25) | D-min (830 mj/cm²) | 0.09 | 0.08 | 0.09 | 0.13 |
| Compound 1 (0.25) | D-min (623 mj/cm²) | 0.10 | 0.10 | 0.10 | 0.14 |

Once again, a significant improvement in reduction of D-min during writing was demonstrated by the perfluorinated anion over the p-toluenesulfonate anion at both writing speeds. The tabulated densities were recorded after zeroing the densitometer on the gelatin subbed support.

EXAMPLE 4

Formulations with an aimed neutral density of 3.4–3.5 were coated with the infrared-absorbing dye levels adjusted for constant adsorptivity as in Example 3 on 100 μm poly(ethylene terephthalate) support primed with a barrier layer of 96% hydrolyzed poly(vinyl alcohol) obtained from Scientific Polymer Products, Inc. at 0.54 g/m² and 0.01 g/m² 10G surfactant (a reaction product of nonylphenol and glycidol) (Olin Corp.) coated from water. The donors were tested as in Example 2 except that the average laser power at the focal plane was 130 mW. The drum was rotated at 150 and 200 rev/min at 981 mj/cm² and 736 mj/cm² to obtain the following results:

TABLE 3

| IR Compound (g/m²) | Condition | Neutral | R | G | B |
|---|---|---|---|---|---|
| Control 1 (0.18) | D-max | 3.43 | 3.55 | 3.17 | 2.90 |
| Control 1 (0.18) | D-min (981 mj/cm²) | 0.10 | 0.09 | 0.11 | 0.16 |
| Control 1 (0.18) | D-min (736 mj/cm²) | 0.15 | 0.14 | 0.15 | 0.20 |
| Compound 1 (0.25) | D-max | 3.44 | 3.61 | 3.15 | 2.90 |
| Compound 1 (0.25) | D-min (981 mj/cm²) | 0.07 | 0.07 | 0.08 | 0.11 |
| Compound 1 (0.25) | D-min (736 mj/cm²) | 0.10 | 0.10 | 0.11 | 0.14 |

The above densities were read after zeroing the densitometer against the subbed base. The results again show a significant improvement in reduction of D-min at both writing speeds.

EXAMPLE 5

Neutral media sheets were prepared by coating the dye formulations on (bare) unsubbed 100 μm, thick poly(ethylene terephthalate) support. The dye formulation was the same as in Example 3, but with the IR dyes listed in Table 4 below at the concentrations indicated adjusted for comparison based upon their absorptivity. The donors were tested as in Example 2 except that the average laser output at the focal plane was 90 mW, providing 679 mj/cm² exposure. In addition, two additional Controls 2 and 3 were coated. The following results were obtained:

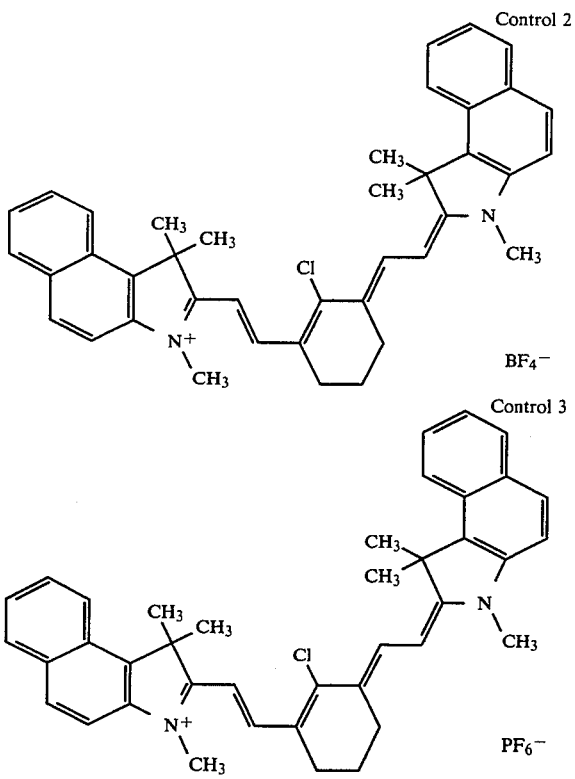

TABLE 4

| IR Compound (g/m²) | Neutral Status A D-max | Neutral Status A D-min |
| --- | --- | --- |
| Control 1 (0.18) | 3.32 | 0.20 |
| Control 2 (0.18) | 3.01 | 0.52 |
| Control 3 (0.18) | 2.95 | 0.53 |
| Compound 1 (0.17) | 3.25 | 0.13 |
| Compound 2 (0.17) | 3.24 | 0.14 |
| Compound 3 (0.22) | 3.17 | 0.10 |

The above densities were read after zeroing the densitometer against the bare base. The above results again indicate an improvement in D-min using the compounds of the invention.

EXAMPLE 6

The formulations of Example 5 were coated on 178 μm gelatin subbed poly(ethylene terephthalate) support and were tested as in Example 3 except that the average laser output at the focal plane was 90 mW. The drum was rotated at 100 and 150 rev/min giving exposures of 1019 mj/cm² and 679 mj/cm². In addition, two additional controls were coated. The following results were obtained:

TABLE 5

| IR Compound (g/m²) | Neutral Status A D-max | Neutral Status A D-min at 1019 mj/cm² | Neutral Status A D-min at 679 mj/cm² |
| --- | --- | --- | --- |
| Control 1 (0.18) | 3.45 | 0.25 | 0.49 |
| Control 2 (0.18) | 2.96 | 0.27 | 0.30 |
| Control 3 (0.18) | 2.95 | 0.27 | 0.28 |
| Compound 1 (0.17) | 3.25 | 0.12 | 0.15 |
| Compound 2 (0.17) | 3.34 | 0.11 | 0.13 |
| Compound 3 (0.22) | 3.36 | 0.08 | 0.08 |

The above densities were read after zeroing the densitometer against the gelatin subbed base. The above results again indicate an improvement in D-min using the compounds of the invention.

EXAMPLE 7

The formulations of Example 5 were then increased 26% for an aim neutral density of 4.0 and coated on 100 μm poly(ethylene terephthalate) primed with a barrier layer of 96% hydrolyzed poly(vinyl alcohol) obtained from Scientific Polymer Products, Inc. at 0.54 g/m² and 0.01 g/m² 10G surfactant (a reaction product of nonylphenol and glycidol) (Olin Corp.) coated from water. The donors were exposed and tested as in Example 6 except the drum was rotated only at 100 rev/min providing an exposure of 1019 mj/cm². The following results were obtained:

TABLE 6

| IR Compound (g/m²) | Neutral Status A D-max | Neutral Status A D-min at 1019 mj/cm² |
| --- | --- | --- |
| Control 1 (0.18) | 4.09 | 0.25 |
| Compound 1 (0.17) | 4.08 | 0.11 |
| Compound 2 (0.17) | 4.14 | 0.14 |
| Compound 3 (0.22) | 3.93 | 0.10 |

The above densities were read after zeroing the densitometer against the subbing base. The results again indicate an improvement in D-min using the compounds of the invention.

The invention has been described in detail with particular reference to preferred embodiments thereof, but it will be understood that variations and modifications can be effected within the spirit and scope of the invention.

What is claimed is:

1. A process of forming a single color dye ablation image having an improved D-min comprising imagewise-heating, by means of a laser, in the absence of a separate receiving element a dye-ablative recording element comprising a support having thereon a dye layer comprising an image dye dispersed in a polymeric binder, said dye layer having an infrared-absorbing material associated therewith to absorb at a given wavelength of said laser used to expose said element, said image dye being substantially transparent in the infrared region of the electromagnetic spectrum and absorbs in the region of from about 300 to about 700 nm and does not have any substantial absorption at the wavelength of said laser used to expose said element, said laser exposure taking place through the dye side of said element, and removing the ablated image dye material to obtain said image in said dye-ablative recording element wherein the infrared-absorbing material is a cyanine dye having a perfluorinated organic counterion.

2. The process of claim 1 wherein said perfluorinated counterion is pentafluoropropionate.

3. The process of claim 1 wherein said perfluorinated counterion is heptafluorobutyrate.

4. The process of claim 1 wherein said perfluorinated counterion is nonafluorobutanesulfonate.

5. The process of claim 1 wherein said infrared-absorbing material is contained in said dye layer.

6. The process of claim 1 wherein said polymeric binder has a polystyrene equivalent molecular weight of at least 100,000 as measured by size exclusion chromatography.

7. The process of claim 1 wherein said polymeric binder is decomposable.

8. The process of claim 1 wherein said polymeric binder is a cellulosic derivative.

9. The process of claim 8 wherein said cellulosic derivative is cellulose nitrate.

10. The process of claim 1 wherein said support is transparent.

* * * * *